Patented July 25, 1939

2,167,441

UNITED STATES PATENT OFFICE 2,167,441

SHAPING POLYVINYLCHLORIDE

Georg Wick, Bitterfeld, Germany, assignor to I. G. Farbenindustrie Aktiengesellschaft, Frankfort-on-the-Main, Germany No Drawing. Application November 19, 1936, Serial No. 111,622. In Germany August 9, 1935

3 Claims. (Cl. 18—55)

My present invention relates to a process for shaping polyvinylchloride and more particularly to such a process wherein neither a softening agent nor an antioxidant nor other polyvinyl esters are added to the polyvinylchloride for facilitating the shaping process.

The shaping of polyvinylchloride, which is obtained in the various processes in the form of a powder or coarse amorphous masses, into forms such as sheets or the like by pressing has hitherto produced only more or less brittle products of comparatively very small tensile and impact strength, the other mechanical properties of the formed bodies being likewise unsatisfactory. In following the practice for forming various other artificial masses, for instance nitrocellulose or Celluloid, high pressures have been used in the relative machines, such as calenders or presses. It has been usual, however, in respect of temperatures, to adopt those which have been common for such machines and not to apply temperatures for shaping the polyvinylchloride in excess of those normal in operating on Celluloid which have been selected for the sake of safety. Since, moreover, the polyvinylchloride suffers gradual decomposition with discoloration when heated for a long time at temperatures essentially above 100° C., particularly if the product is not of a very high degree of purity, a strong prejudice towards the use of high temperatures has prevailed on this account and, in fact, for industrial use polyvinylchloride is always plasticized by addition of softening agents and similar products.

The present invention is based on the observation that a rapid and considerable increase of temperature above that hitherto regarded as a permissible limit, accompanied by simultaneous application of pressure, leads to a surprising result. When the powdered material, for example, is heated rapidly on a calender at a working temperature of about 150° C. the polyvinylchloride with a degree of polymerization $K=60$ (this K-value being calculated according to the equations given in Cellulose-Chemie, vol. XIII, 1932, page 60, right column), suffers almost suddenly a change progressing through the mass producing a sheet which can be removed from the calender and is transparent and at the same time has a high flexibility and extensibility, sufficient strength and excellent other mechanical properties. The phenomena of decomposition are not apparent, notwithstanding the high temperature.

Sheets having the aforesaid properties may be made in the thickness of a few millimeters; thinner sheets may be made either directly or by further rolling thicker sheets at temperatures below as well as above the original manufacturing temperature. Sheets of this kind may be used in most of the cases in which a flexible transparent foil is required and the material exhibits complete non-inflammability as compared with other organic artificial materials. The sheets are applicable for all purposes for which hitherto sheets of plastic material made by casting solutions have been applied.

Furthermore, under the said working conditions polyvinylchloride may be worked up to form commodities of all kinds. In manufacturing bodies of greater volume as, for instance, tubes, the powdery polyvinylchloride is subjected to a pretreatment wherein it is plastified by heating in a kneading machine or on the calender, whereby simultaneously bubbles of air are removed. The material still hot and viscous, is then brought into the press and shaped to the desired form at a temperature, which for a polyvinylchloride of a degree of polymerization=60 is at about 150°. For the shaping operation besides a tube-extrusion-press any other press-mold may be used; the material may likewise be molded by injection molding or pressure casting.

The temperature at which the shaping is carried out according to the present invention depends upon the degree of polymerization of the polyvinylchloride. The polymerisate of the K value=60 is preferably shaped under pressure at about 150° C. This temperature is to be raised if polymerized vinylchloride of a higher degree of polymerization is to be worked up, it may be lowered with polymerisates having a lower molecular weight. By a simple test in any case the best temperature is easily ascertainable. Since, however, this temperature is near the range of temperature wherein decomposition of the polyvinylchloride occurs, shaping should be performed as quickly as possible. In this manner, formed bodies clear as glass, colorless or at most feebly colored, can be obtained. The articles shaped under the aforesaid conditions have a surprising high tensile and impact strength and a sufficient elasticity. By warming to the fostening point a further shaping may be carried out. A mechanical working or fashioning may be carried out at room temperature or at a somewhat higher temperature.

What I claim is:

1. The process for shaping crude polyvinylchloride in the absence of plasticizers and antioxidants which consists in pressing the said material at a temperature above about 40° C. and approximating that temperature at which said polyvinyl chloride would normally be expected to depolymerize, the temperature being higher the higher the degree of polymerization.

2. The process for shaping polyvinylchloride of a degree of polymerization K=about 60 in the absence of plasticizers and antioxidants, which consists in pressing the said material at a temperature of about 150° C. and approximating that temperature at which said polyvinyl chloride would normally be expected to depolymerize.

3. The process for shaping polyvinylchloride in the absence of plasticizers and antioxidants, which consists in subjecting the said material to pressure at a temperature which rapidly increases to above about 140° C. and approximating that temperature at which said polyvinyl chloride would normally be expected to depolymerize, the temperature being higher the higher the degree of polymerization

GEORG WICK.

CERTIFICATE OF CORRECTION.

Patent No. 2,167,441.   July 25, 1939.

GEORG WICK.

It is hereby certified that error appears in the printed specification of the above numbered patent requiring correction as follows: Page 1, second column, line 46, for "fostening" read softening; line 55, claim 1, for "40° C." read 140° C.; and that the said Letters Patent should be read with this correction therein that the same may conform to the record of the case in the Patent Office.

Signed and sealed this 20th day of February, A. D. 1940.

(Seal)

Henry Van Arsdale,
Acting Commissioner of Patents.

approximating that temperature at which said polyvinyl chloride would normally be expected to depolymerize, the temperature being higher the higher the degree of polymerization.

2. The process for shaping polyvinylchloride of a degree of polymerization K=about 60 in the absence of plasticizers and antioxidants, which consists in pressing the said material at a temperature of about 150° C. and approximating that temperature at which said polyvinyl chloride would normally be expected to depolymerize.

3. The process for shaping polyvinylchloride in the absence of plasticizers and antioxidants, which consists in subjecting the said material to pressure at a temperature which rapidly increases to above about 140° C. and approximating that temperature at which said polyvinyl chloride would normally be expected to depolymerize, the temperature being higher the higher the degree of polymerization

GEORG WICK.

CERTIFICATE OF CORRECTION.

Patent No. 2,167,441.                       July 25, 1939.

GEORG WICK.

It is hereby certified that error appears in the printed specification of the above numbered patent requiring correction as follows: Page 1, second column, line 46, for "fostening" read softening; line 55, claim 1, for "40° C." read 140° C.; and that the said Letters Patent should be read with this correction therein that the same may conform to the record of the case in the Patent Office.

Signed and sealed this 20th day of February, A. D. 1940.

(Seal)                                                      Henry Van Arsdale,
                                                           Acting Commissioner of Patents.